United States Patent
Chen (10) Patent No.: US 11,526,377 B2
(45) Date of Patent: Dec. 13, 2022

(54) METHOD FOR EXECUTING TASK BY SCHEDULING DEVICE, AND COMPUTER DEVICE AND STORAGE MEDIUM

(71) Applicant: HANGZHOU HIKVISION DIGITAL TECHNOLOGY CO., LTD., Hangzhou (CN)

(72) Inventor: Zhe Chen, Hangzhou (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 2 days.

(21) Appl. No.: 15/733,872

(22) PCT Filed: May 28, 2019

(86) PCT No.: PCT/CN2019/088812
§ 371 (c)(1),
(2) Date: Nov. 30, 2020

(87) PCT Pub. No.: WO2019/228346
PCT Pub. Date: Dec. 5, 2019

(65) Prior Publication Data
US 2021/0224108 A1    Jul. 22, 2021

(30) Foreign Application Priority Data
May 31, 2018    (CN) .................... 201810551595.8

(51) Int. Cl.
*G06F 9/48*    (2006.01)
*G06F 9/50*    (2006.01)
*G06F 9/455*    (2018.01)

(52) U.S. Cl.
CPC ............ *G06F 9/4881* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/4557;
(Continued)

(56) References Cited

U.S. PATENT DOCUMENTS

| 7,346,186 B2 | 3/2008 | Sharoni et al. | |
| 2004/0205730 A1* | 10/2004 | Week .................. | G06F 8/20 717/136 |

(Continued)

FOREIGN PATENT DOCUMENTS

| CN | 102624865 A | 8/2012 |
| CN | 103366238 A | 10/2013 |

(Continued)

OTHER PUBLICATIONS

Extended European search report of counterpart EP application No. 19812398.6 dated Oct. 15, 2021.
(Continued)

*Primary Examiner* — Charles M Swift
(74) *Attorney, Agent, or Firm* — Knobbe, Martens, Olson & Bear, LLP (57) ABSTRACT

A method for executing a task by a scheduling device, belonging to the technical field of electronics. The method includes: acquiring a target algorithm corresponding to a target task to be executed; acquiring an execution environment condition for a target algorithm, and current execution environment information of various execution devices; in the execution devices, determining a target execution device of which the execution environment information satisfies the execution environment condition; and sending a control message for executing the target task to the target execution device.

11 Claims, 4 Drawing Sheets

(52) U.S. Cl.
CPC ............ *G06F 9/45558* (2013.01); *G06F 9/48* (2013.01); *G06F 9/485* (2013.01); *G06F 9/4806* (2013.01); *G06F 9/4843* (2013.01); *G06F 9/50* (2013.01); *G06F 9/5005* (2013.01); *G06F 9/5016* (2013.01); *G06F 9/5022* (2013.01); *G06F 9/5027* (2013.01); *G06F 9/5033* (2013.01); *G06F 9/5038* (2013.01); *G06F 9/5044* (2013.01); *G06F 9/5072* (2013.01); *G06F 9/5083* (2013.01); *G06F 9/5088* (2013.01); *G06F 2009/4557* (2013.01); *G06F 2009/45575* (2013.01)

(58) Field of Classification Search
CPC ............ G06F 2009/45575; G06F 9/48; G06F 9/4843; G06F 9/485; G06F 9/4881; G06F 9/50; G06F 9/5005; G06F 9/5016; G06F 9/5027; G06F 9/5033; G06F 9/5038; G06F 9/5044; G06F 9/505; G06F 9/5055; G06F 2209/501; G06F 2209/549
See application file for complete search history.

(56) References Cited

U.S. PATENT DOCUMENTS

| | | | |
|---|---|---|---|
| 2009/0327944 A1* | 12/2009 | Sugure | G06F 30/33 |
| | | | 703/7 |
| 2010/0058349 A1 | 3/2010 | Diwakar et al. | |
| 2014/0019988 A1* | 1/2014 | Shpigelman | G06F 9/5016 |
| | | | 718/104 |
| 2015/0066646 A1 | 3/2015 | Sriharsha et al. | |
| 2016/0132361 A1* | 5/2016 | Davidson | G06F 9/5038 |
| | | | 718/104 |
| 2017/0195173 A1* | 7/2017 | Izenberg | G06F 15/7871 |
| 2018/0288129 A1* | 10/2018 | Joshi | H04L 41/5035 |
| 2018/0314971 A1* | 11/2018 | Chen | G06N 20/00 |
| 2019/0243682 A1* | 8/2019 | Botelho | G06F 9/4881 |
| 2019/0250946 A1* | 8/2019 | Parameshwaran | G06F 9/5088 |

FOREIGN PATENT DOCUMENTS

| | | |
|---|---|---|
| CN | 103500123 A | 1/2014 |
| CN | 105701099 A | 6/2016 |
| CN | 106874120 A | 6/2017 |
| CN | 107092522 A | 8/2017 |
| CN | 107977257 A | 5/2018 |
| CN | 107992359 A | 5/2018 |
| WO | 2017117122 A1 | 7/2017 |

OTHER PUBLICATIONS

Partial supplementary European search report of counterpart EP application No. 19812398.6 dated Jun. 28, 2021.
Fahmy Suhaib A et al., Virtualized FPGA Accelerators for Efficient Cloud Computing; 2015 IEEE 7th International Conference on Cloud Computing Technology and Science (CloudCom), IEEE, Nov. 30, 2015, pp. 430-435, p. 5.
Ken Eguro et al., FPGAs for trusted cloud computing; Field Programmable Logic and Applications (FPL), 2012 22nd International Conference On, IEEE, Aug. 29, 2012, pp. 63-70, entire document.
First office action of Chinese application No. 201810551595.8 dated Sep. 3, 2021.
International Search Report and Written Opinion for PCT application No. PCT/CN2019/088812 dated Aug. 30, 2019.

* cited by examiner

METHOD FOR EXECUTING TASK BY SCHEDULING DEVICE, AND COMPUTER DEVICE AND STORAGE MEDIUM

The present application is a national phase application of PCT International Application No. PCT/CN2019/088812, filed on May 28, 2019 and entitled "METHOD AND APPARATUS FOR EXECUTING TASK BY SCHEDULING DEVICE", which claims priority to Chinese Patent Application No. 201810551595.8, filed on May 31, 2018 and entitled "METHOD AND APPARATUS FOR EXECUTING TASK BY SCHEDULING DEVICE". Both applications are incorporated herein by reference in their entirety.

TECHNICAL FIELD

The present disclosure relates to the technical field of electronics, and in particular, relates to a method for executing a task by a scheduling device, and a computer device and a storage medium.

BACKGROUND

When an image analysis task needs to be executed, usually, each task is manually allocated to each of the execution devices. For example, a user receives two tasks. One is to detect a face in each frame of image in a video A, and the other is to feather an image B. The user may manually allocate the task of detecting the face in each frame of image in the video A to an execution device C, and allocate the task of feathering the image B to an execution device D.

SUMMARY

The present disclosure provides the following technical solutions capable of the efficiency of executing tasks.

According to an aspect of embodiments of the present disclosure, a method for executing a task by a scheduling device is provided. The method includes:

acquiring a target algorithm corresponding to a to-be-executed target task;

acquiring an execution environment condition for the target algorithm and current execution environment information of each of execution devices;

determining, from the execution devices, a target execution device where execution environment information satisfies the execution environment condition; and sending a control message for executing the target task to the target execution device.

According to another aspect of embodiments of the present disclosure, a computer device is provided. The computer device includes a processor, a communications interface, a memory, and a communications bus; wherein the processor, the communications interface, and the memory communicate with each other by using the communications bus;

the memory is configured to store a computer program; and the processor is configured to run the program stored in the memory, to perform following steps:

acquiring a target algorithm corresponding to a to-be-executed target task;

acquiring an execution environment condition for the target algorithm and current execution environment information of each of execution devices;

determining, from the execution devices, a target execution device where execution environment information satisfies the execution environment condition; and sending a control message for executing the target task to the target execution device.

According to yet another aspect of embodiments of the present disclosure, a computer-readable storage medium is provided. The computer-readable storage medium stores a computer program. The computer program, when run by a processor, enables the processor to perform following steps:

acquiring a target algorithm corresponding to a to-be-executed target task;

acquiring an execution environment condition for the target algorithm and current execution environment information of each of execution devices;

determining, from the execution devices, a target execution device where execution environment information satisfies the execution environment condition; and sending a control message for executing the target task to the target execution device.

It is to be understood that both the foregoing general description and the following detailed description only provide examples and are explanatory, only and are not intended to limit the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure. In the accompanying drawings.

With reference to the above drawings, explicit embodiments of the present disclosure have been shown, and will be described in more detail later. These drawings and text descriptions are not intended to limit the scope of the concept of the present disclosure in any form, but to explain the concepts of the present disclosure to those skilled in the art by referring to specific embodiments.

DETAILED DESCRIPTION

Reference will now be made in detail to example embodiments, examples of which are illustrated in the accompanying drawings. Where the description hereinafter refers to the accompanying drawings, the same reference numerals in different drawings represent the same or similar elements, unless otherwise represented. The embodiments set forth in the following description are merely examples, but not represent all embodiments consistent with the present disclosure. Instead, these embodiments are merely examples of devices and methods consistent with aspects related to the present disclosure as recited in the appended claims.

Figure 1:
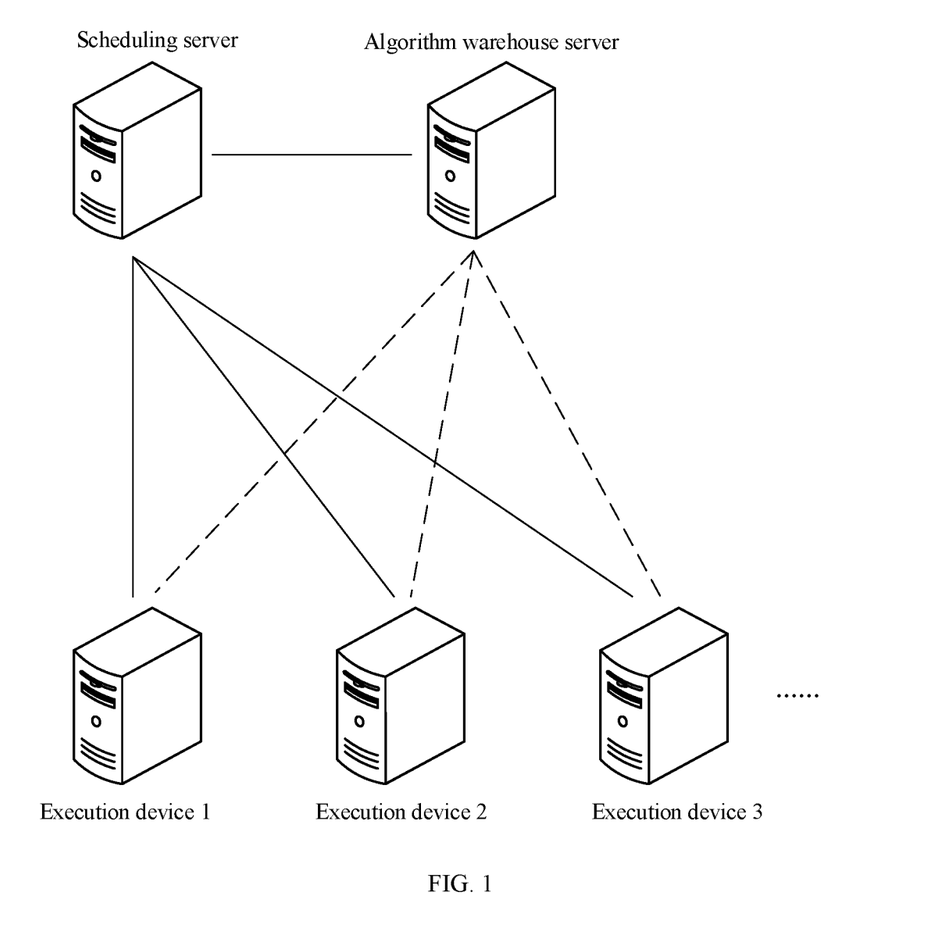
FIG. 1 is a schematic structural diagram of a system for executing a task by a scheduling device according to an example embodiment.

An embodiment of the present disclosure provides a method for executing a task by a scheduling device. The method may be performed by a computer device such as a scheduling server, and may be performed by cooperation between an algorithm warehouse server and an execution device. FIG. 1 is a schematic structural diagram of a system for executing a task by a scheduling device according to an embodiment of the present disclosure.

The scheduling server may include a processor, a memory and the like. The processor may be a processor such as a central processing unit (CPU) that may be configured to determine, from the execution devices, a target execution device where execution environment information satisfies an execution environment condition, or that may be configured to execute other processing. The memory may be a random access memory (RAM), a flash memory, or the like that may be configured to store received data, data required in a processing process, data generated in the processing process, or the like, such as an execution environment condition.

The scheduling server may further include a transceiver. The transceiver may be configured to transmit data to another server. The transceiver may include a Bluetooth component, a wireless-fidelity (Wi-Fi) component, an antenna, a matching circuit, a modem, and the like.

Figure 2:
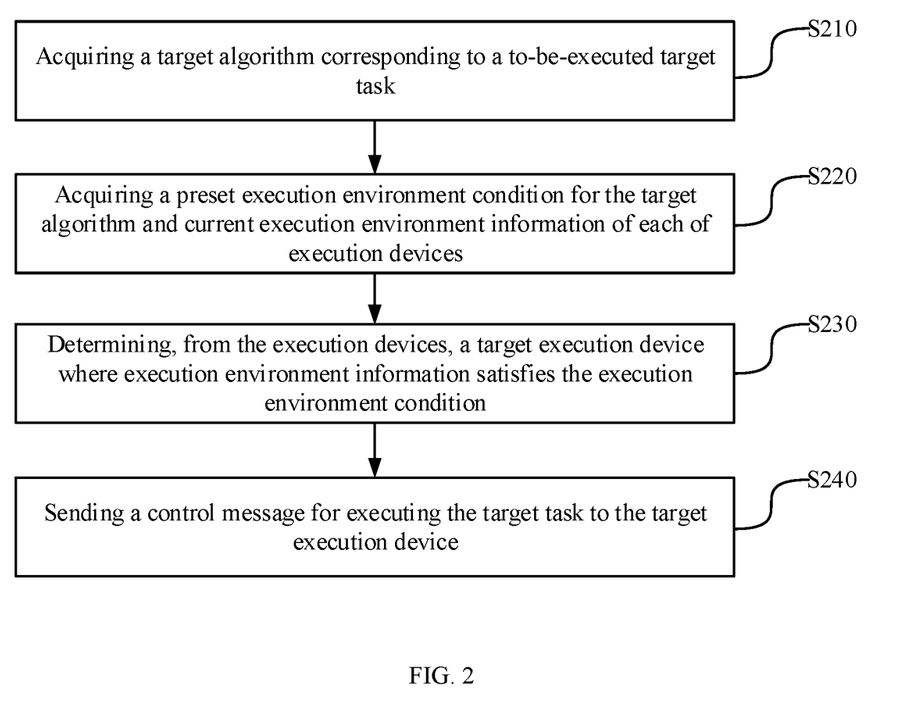
FIG. 2 is a schematic flowchart of a method for executing a task by a scheduling device according to an example embodiment.

An example embodiment of the present disclosure provides a method for executing a task by a scheduling device. As shown in FIG. 2, the method may include the following steps:

In step S210, a target algorithm corresponding to a to-be-executed target task is acquired.

A scheduling server may directly acquire the to-be-executed target task, the to-be-executed target task may be acquired from a terminal, and a user may perform an operation on the terminal, to allocate the to-be-executed target task to the terminal.

Alternatively, a user may trigger, by a preset operation, generation of an instruction on querying specific preset algorithms in an algorithm warehouse server. In this way, the user may learn what tasks can be executed by execution devices by using these algorithms, then allocate the task that can be executed by the execution device, as the to-be-executed target task, to the scheduling server. In other words, the user may select the to-be-executed target task in the algorithm warehouse server, and when detecting that the to-be-executed target task is selected, the algorithm warehouse server may send the to-be-executed target task to the scheduling server. The scheduling server may acquire the to-be-executed target task. In addition, the user may further trigger, by a preset operation, generation of an instruction on querying an algorithm that can be currently executed by the execution device. The scheduling server needs to synthesize situations of the algorithm warehouse server and the execution device, makes an analysis to acquire the algorithm that can be currently executed by the execution device, and feeds back, to the terminal, information about the algorithm that can be currently executed by the execution device.

A correspondence between a task identifier and an algorithm may be preset in the scheduling server. When acquiring the to-be-executed target task, the scheduling server may determine an identifier of the to-be-executed target task, such that the target algorithm corresponding to the identifier of the to-be-executed target task may be determined. For example, if the to-be-executed target task is a face recognition task, the target algorithm is an algorithm related to the face recognition. If the to-be-executed target task is an image feathering task, the target algorithm is an algorithm related to the image feathering. The target task may be implemented by using the target algorithm.

In step S220, a preset execution environment condition for the target algorithm and current execution environment information of each of execution devices are acquired.

Execution environment conditions for a plurality of algorithms may be locally prestored in the scheduling server. When determining the target algorithm corresponding to the to-be-executed target task, the scheduling server may determine the execution environment condition corresponding to the target algorithm.

Figure 3:
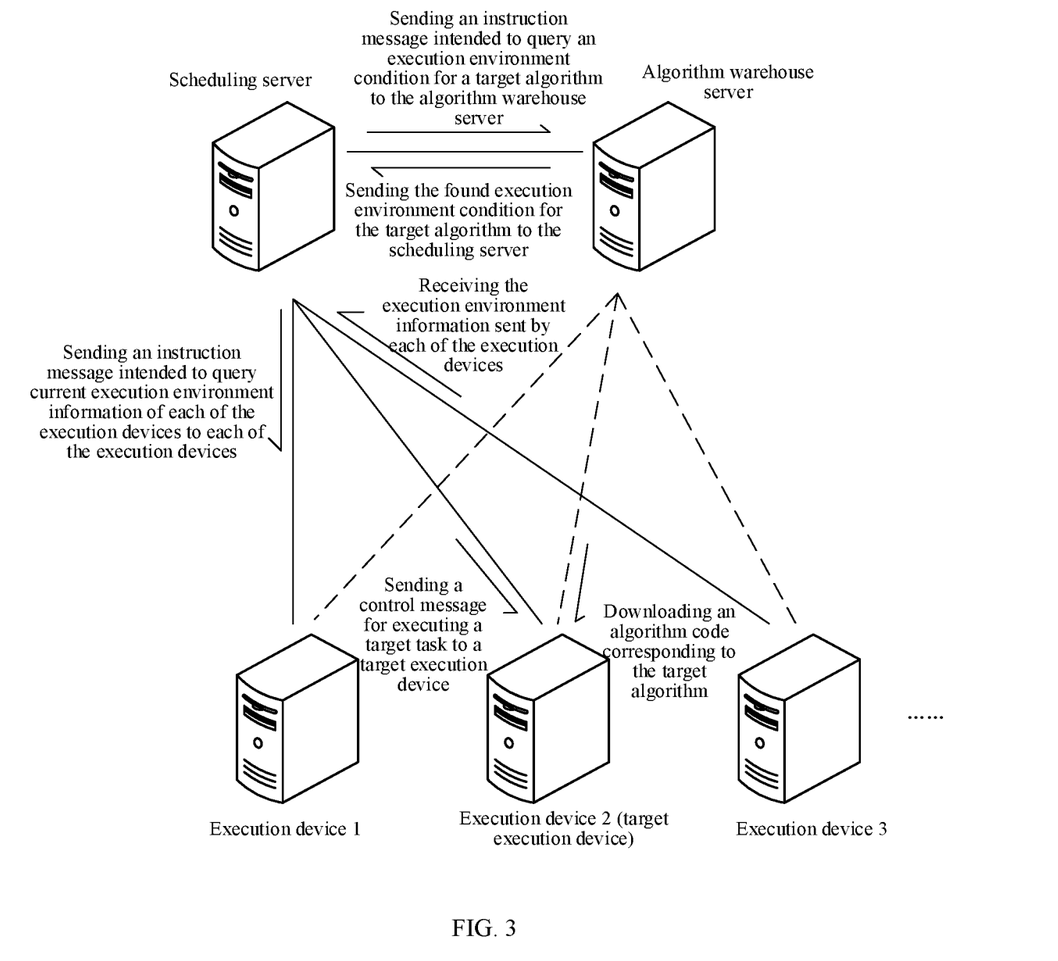
FIG. 3 is a schematic flowchart of a method for executing a task by a scheduling device according to an example embodiment.

Alternatively, as shown in FIG. 3, the target algorithm may be provided by the algorithm warehouse server, algorithm codes and an algorithm library (a library file acquired after the algorithm codes are encoded) that correspond to the plurality of algorithms may be prestored in the algorithm warehouse server, and the algorithm codes and the algorithm library may be packaged to acquire an algorithm package. Execution environment conditions of the algorithm codes may be further prestored in the algorithm warehouse server The scheduling server may send an instruction message intended to query the execution environment condition for the target algorithm to the algorithm warehouse server. Upon receipt of the instruction message, the algorithm warehouse server may query the execution environment condition for the target algorithm from the plurality of prestored algorithm codes and the execution environment conditions of the algorithm codes, and send the found execution environment condition for the target algorithm to the scheduling server.

Alternatively, if a user allocates no task to the scheduling server, and only intends to query specific algorithms that can be executed by the algorithm warehouse server, the user may perform a preset query operation in the terminal. The terminal may detect a query instruction, generate a query message, and send the query message to the scheduling server. The scheduling server may query, in the algorithm warehouse server, the specific algorithms that can be executed by the algorithm warehouse server and execution environment conditions for the algorithms. After the found algorithms, the execution environment conditions for the algorithms, and the execution devices are associated, the scheduling server may return the found algorithms and the execution environment conditions to the terminal. The terminal may display the algorithms and the execution environment conditions of the algorithms for user reference.

In addition, as shown in FIG. 3, the scheduling server may further send an instruction message intended to query current execution environment information of the each of the execution devices to the each of the execution devices. Upon receipt of the instruction message, the each of the execution devices determines each piece of current execution environment information, and sends each piece of current execution environment information to the scheduling server. The scheduling server may acquire the current execution environment information of the each of the execution devices.

Alternatively, if the user allocates no task to the scheduling server at the beginning of the solution, only intends to query a current situation of the each of the execution devices, the specific algorithms that can be executed by the algorithm warehouse server, and the execution environment conditions for the algorithms for overall consideration, and determines specific tasks that are to be allocated to the scheduling server and that can be executed by the each of the execution devices connected to the scheduling server. Firstly, the user may perform a preset query operation in the terminal. The terminal may detect a query instruction, generate a query message, and send the query message to the scheduling server. The scheduling server may query, in the each of the execution devices, the current execution environment information of the each of the execution devices. The scheduling server returns the found current execution environment information of the each of the execution devices to the terminal, and the terminal may display the current execution environment information of the each of the execution devices. Furthermore, the terminal may display the algorithms, the execution environment conditions of the algorithms, and the current execution environment information of the each of the execution devices.

In step S230, a target execution device where execution environment information satisfies the execution environment condition is determined from the execution devices.

The target algorithm cannot be successfully executed on all the execution devices or in current situations of all the devices. The target algorithm has a condition requirement on an execution environment, and a specific condition is recorded in the execution environment condition for the target algorithm. When execution environment information of one of the execution devices satisfies the execution environment condition for the target algorithm, the device may execute the to-be-executed target task corresponding to the algorithm.

Optionally, the step of acquiring current execution environment information of each of execution devices may include: acquiring a current computing capability value, a current chip model, and current system environment information of the each of the execution devices, wherein the system environment information includes a system bit width and a kernel version. The step of determining, from the execution devices, the target execution device where execution environment information satisfies the execution environment condition may include: determining, from the execution devices, a target execution device where the computing capability value is greater than or equal to a computing capability value threshold corresponding to the target algorithm, the chip model matches a reference chip model corresponding to the target algorithm, and the system environment information matches reference system environment information corresponding to the target algorithm.

The execution devices may not be in a completely idle state, and may execute some tasks before the scheduling server performs scheduling. However, the execution devices are not in a completely busy state, in other words, may execute another task. A capability of the each of the execution devices executing another task may be indicated by using the computing capability value, and the value may be indicated in percentage. When the execution device is in a completely idle state, the computing capability value may be 100%. If some computing resources are occupied when the execution device executes a task, the computing capability value may turn into 43%, and 43% is a current computing capability value of the execution device.

The chip model of the chip configured in the each of the execution devices may be the same or different. The chip model may include a CPU model, a GPU model, and a model (such as a TX1 or a model P4 of a video card) of a chip integrating with both a CPU and a GPU. Some algorithms pose a requirement on the chip model of the chip configured in the execution device. This is determined when an algorithm code corresponding to an algorithm is written. When the algorithm code is determined, a required chip model of a chip configured in the execution device is determined. If the algorithm code is executed on a mismatched execution device, a program crash or a running error may occur. Therefore, an execution device suitable for running of the algorithm code may be selected for the algorithm code.

In addition to the requirement on the model of the running chip, the algorithm may further pose a corresponding requirement on another parameter of the execution device. A system bit width of the execution device is generally 32 bits, 64 bits, or the like. A kernel version may be 24. Models of same chips are similar. Some algorithms pose a requirement on the system bit width and the kernel version of the execution device. This is determined when the algorithm code is written. After the algorithm code is determined, the required system bit width and kernel version of the execution device are determined. If the algorithm code is executed on a mismatched execution device, the algorithm code may not be executed. When both the system bit width and the kernel version of the execution device satisfy the requirements of the algorithm, the algorithm code may be successfully executed.

The current execution environment information of the each of the execution devices may be represented in JavaScript Object Notation (JSON), for example:

```
{
chip:tx1;
ability:0.5;
bitset:64;
kernel:24;
}
```

The scheduling server may determine, from the execution devices, the target execution device where the computing capability value is greater than or equal to the computing capability value threshold corresponding to the target algorithm, the chip model matches the reference chip model corresponding to the target algorithm, and the system environment information matches the reference system environment information corresponding to the target algorithm.

Optionally, the step of acquiring the current computing capability value of the each of the execution devices may include: determining the current computing capability value of the each of the execution devices based on a current CPU idle ratio, a current GPU idle ratio, and a current memory idle ratio of the each of the execution devices.

A largest value among a CPU idle ratio, a GPU idle ratio, and a memory idle ratio that correspond to an algorithm may be determined as a computing capability value corresponding to the algorithm. A smallest value among the current CPU idle ratio, the current GPU idle ratio, and the current memory idle ratio of the execution device is determined as the current computing capability value of the execution device. In this way, when the smallest value among the current CPU idle ratio, the current GPU idle ratio, and the current memory idle ratio of the execution device may exceed the largest value among the CPU idle ratio, the GPU idle ratio, and the memory idle ratio that correspond to the algorithm, another current non-smallest value of the execution device may also exceed another non-largest value corresponding to the algorithm, such that the computing capability value of the execution device may be greater than or equal to the computing capability value threshold of the algorithm.

As described above, there is no need to sequentially compare current computing capability values of the execution devices with computing capability values required by corresponding algorithms. Provided that a smallest value among the current computing capability values of the execution devices is compared with a largest value among the computing capability values required by the algorithms only once, whether the current computing capability values of the execution devices can satisfy the computing capability values required by the algorithms may be determined, such that a calculation burden in a comparison process can be reduced. A plurality of different values corresponding to the computing capability values may be converted into one value. When the values corresponding to the computing capability values increase, the plurality of original values and the increased values may still be converted into one value. In this way, the way of determining a computing capability value may not be changed.

Optionally, the step of determining the current computing capability value of the each of the execution devices based on a current CPU idle ratio, a current GPU idle ratio, and a current memory idle ratio of the each of the execution devices may include: for one of the execution devices except a preset reference execution device, multiplying a current CPU idle ratio of the execution device by a first ratio value to acquire a first number; multiplying a current GPU idle ratio of the execution device by a second ratio value to acquire a second number; multiplying a current memory idle ratio of the execution device by a third ratio value to acquire a third number; determining a smallest value among the first number, the second number, and the third number as a current computing capability value of the execution device, wherein the first ratio value is a ratio of a CPU basic performance value of the execution device to a CPU basic performance value of the reference execution device, the second ratio value is a ratio of a GPU basic performance value of the execution device to a GPU basic performance value of the reference execution device, and the third ratio value is a ratio of a total memory capacity of the execution device to a total memory capacity of the reference execution device; and for the preset reference execution device, determining a smallest value among a current CPU idle ratio, a current GPU idle ratio, and a current memory idle ratio of the reference execution device as a current computing capability value of the reference execution device.

To manage and schedule all the execution devices in a unified fashion, the computing capability values of the execution devices may be normalized. A reference execution device may be selected from the execution devices, and the reference execution device may be a pre-selected execution device that is relatively common on the market. A computing capability value of the reference execution device that is idle and stores no data is set to 100%. For one of the execution devices except the preset reference execution device, the current CPU idle ratio of the execution device is multiplied by the first ratio value to acquire the first number; the current GPU idle ratio of the execution device is multiplied by the second ratio value to acquire the second number; the current memory idle ratio of the execution device is multiplied by the third ratio value to acquire the third number.

For example, the reference execution device has a dual-core CPU. If one of the execution devices other than the preset reference execution device has a quad-core CPU, the first ratio value is the ratio of the CPU basic performance value of the execution device to the CPU basic performance value of the reference execution device, and the ratio is 2. This is because a processing capability of the quad-core CPU is twice that of the dual-core CPU. The reference execution device has a dual-core CPU. If one of the execution devices other than the preset reference execution device has a single-core CPU, the first ratio value is the ratio of the CPU basic performance value of the execution device to the CPU basic performance value of the reference execution device, and the ratio is 0.5. This is because a processing capability of the single-core CPU is half that of the dual-core CPU.

After the first number, the second number, and the third number are determined, a smallest value thereamong is selected as the current computing capability value of the execution device. The computing capability value of the reference execution device may also be determined in such a fashion.

Optionally, the method provided in this embodiment of the present disclosure further includes: acquiring an algorithm corresponding to a task currently executed by the each of the execution devices. Step S230 may include: determining, from the execution devices, a target execution device where execution environment information satisfies the execution environment condition and where an algorithm corresponding to a currently executed task is the target algorithm.

The target execution device where execution environment information satisfies the execution environment condition may be selected from the execution devices for which the algorithm corresponding to the currently executed task is the target algorithm. The target execution device where execution environment information satisfies the execution environment condition and where the algorithm corresponding to the currently executed task is the target algorithm already downloads a target algorithm code and may be executing the target algorithm code. Therefore, for the target execution device, an operation of downloading the target algorithm code may be omitted. A data volume of the algorithm code may achieve hundreds of megabytes, and is relatively large. The downloading operation is time-consuming, especially when network bandwidth between the algorithm warehouse server and the each of the execution devices is relatively narrow, the downloading operation is more time-consuming. Based on the method provided in this embodiment of the present disclosure, the time for downloading the target algorithm code may be reduced.

Because the target execution device already loads the target algorithm code, an operation of loading the target algorithm code is omitted.

In addition, a current running environment of the target execution device is relatively suitable for executing the target algorithm code. The efficiency of executing the target algorithm code is relatively high, such that an efficiency of executing the target task is also relatively high. This is because a corresponding virtual machine or container needs to be established whenever a type of algorithm code is run, if the algorithm code is executed in the virtual machine or container. When the execution is completed, the virtual machine or container may be destroyed, to release resources. Because the target execution device already establishes the virtual machine or container corresponding to the target algorithm code, the target algorithm code corresponding to the target task may continue to be executed in the virtual machine or container, thereby omitting an operation of establishing the virtual machine or container, and increasing the efficiency of executing the target algorithm code.

In step S240, a control message for executing the target task is sent to the target execution device.

As shown in FIG. 3, after the target execution device is determined, the scheduling server may send the control message for executing the target task to the target execution device. The control message may be intended to instruct the target execution device to execute a specific target task. In addition, the scheduling server may further send a file corresponding to the target task to the target execution device. The file corresponding to the target task may include various types of files, such as an image, a video, and an audio. Then the execution device may perform related processing on the file corresponding to the target task by using the target algorithm.

Optionally, the method according to this embodiment of the present disclosure may further include: upon receipt of a task execution failure message returned by the target execution device, acquiring the execution environment condition for the target algorithm and current execution environment information of the each of the execution devices except the target execution device, determining, from the execution devices except the target execution device, an execution device where execution environment information satisfies the execution environment condition, and sending the control message for executing the target task to the determined execution device.

The target task corresponding to the target algorithm may be executed in the target execution device. If the target execution device can successfully execute the target task corresponding to the target algorithm, the target execution device may send a task execution success message to the scheduling server. In contrast, if the target execution device cannot successfully execute the target task corresponding to the target algorithm, the target execution device may send a task execution failure message to the scheduling server. The scheduling server may receive the task execution failure message sent by the target execution device, then acquire the execution environment condition for the target algorithm and the current execution environment information of one of the execution devices except the target execution device, reselect, from the execution devices except the target execution device, the execution device where execution environment information satisfies the execution environment condition, and send the control message for executing the target task to the newly determined execution device, such that the newly determined execution device executes the target task.

Optionally, the method according to this embodiment of the present disclosure further includes: sending an instruction message to the algorithm warehouse server, wherein the instruction message is intended to instruct the algorithm warehouse server to send the algorithm code corresponding to the target algorithm to the target execution device.

The scheduling server may send the instruction message to the algorithm warehouse server. If all algorithm codes are stored in the algorithm warehouse server, the scheduling server stores no algorithm code, and the each of the execution devices also stores no algorithm code, before specifically executing the target task, the target execution device needs to download the target algorithm from the algorithm warehouse server, to execute the target task. The scheduling server may send the instruction message to the algorithm warehouse server. Upon receipt of the instruction message, the algorithm warehouse server may determine that a specific device is the target execution device, and that the target execution device needs a specific algorithm code. As shown in FIG. 3, the algorithm warehouse server may acquire the algorithm code corresponding to the target algorithm, and send the algorithm code to the target execution device.

Alternatively, upon receipt of the control message for executing the target task, the target execution device determines the algorithm code corresponding to the target algorithm required for executing the target task. Next, the algorithm code is downloaded from the algorithm warehouse server.

In this way, each of the execution devices may more flexibly execute the task. Compared with a solution in which one or several algorithms are fixed on an execution device and an execution device can execute only one or several specific tasks, based on the method provided in this embodiment of the present disclosure, an operation of the execution device executing the task is made more flexible. When a requirement is imposed, the algorithm code is dynamically downloaded from the algorithm warehouse server, such that one of the execution devices where execution environment information satisfies the execution environment condition may execute the task corresponding to the algorithm code that can be provided by the algorithm warehouse server.

In the related art, when a task is specifically to be executed, an algorithm corresponding to the task needs to be invoked to actually execute the task based on the algorithm. For example, to execute the task of detecting the face image in each frame of image in the video A, a face recognition algorithm needs to be invoked. The tasks often need to be sequentially allocated to a plurality of execution devices for execution attempts until the tasks are successfully executed. In this process, when a task is allocated to an execution device, if the execution device cannot successfully execute the task, the execution device returns execution failure prompt information to the user.

In the case of a relatively large quantity of tasks and a relatively large quantity of execution devices, hardware resources of each of the execution devices are severely occupied. In this case, when an attempt to execute a task on different execution devices is made, the attempt failure probability is high, the attempt quantity may be large, and the task execution efficiency may be low.

In the method provided in this embodiment of the present disclosure, the target execution device that can successfully execute the target algorithm may be automatically found for the target algorithm based on the execution environment condition for the target algorithm and the current execution environment information of the devices. In this way, an attempt to sequentially execute the target task on the plurality of execution devices is avoided, such that even in the case of relatively large quantity of tasks and a relatively large quantity of execution devices, a different algorithm can be automatically matched to an execution device that can successfully execute the algorithm, thereby achieving a relatively high task allocation efficiency and a relatively high task execution efficiency.

Figure 4:
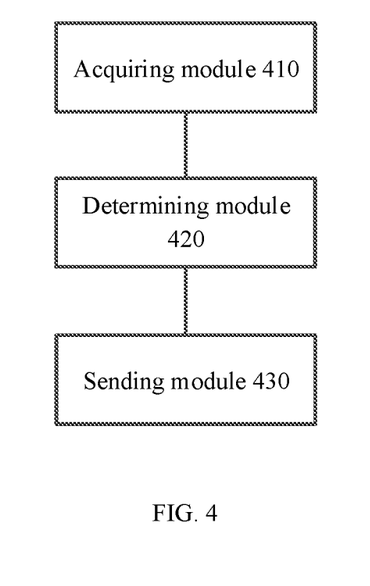
FIG. 4 is a schematic structural diagram of an apparatus for executing a task by a scheduling device according to an example embodiment.

Another example embodiment of the present disclosure provides an apparatus for executing a task by a scheduling device. As shown in FIG. 4, the apparatus includes:

an acquiring module 410, configured to acquire a target algorithm corresponding to a to-be-executed target task, wherein the acquiring module 410 is configured to acquire an execution environment condition for the target algorithm and current execution environment information of each of execution devices;

a determining module 420, configured to determine, from the execution devices, a target execution device where execution environment information satisfies the execution environment condition; and a sending module 430, configured to send a control message for executing the target task to the target execution device.

Optionally, the acquiring module 410 is further configured to acquire an algorithm corresponding to a task currently executed by the each of the execution devices; and the determining module 420 is configured to determine, from the execution devices, a target execution device where execution environment information satisfies the execution environment condition and where an algorithm corresponding to a currently executed task is the target algorithm.

Optionally, the acquiring module 410 is configured to acquire a current computing capability value, a current chip model, and current system environment information of the each of the execution devices, wherein the system environment information includes a system bit width and a kernel version; and the determining module 420 is configured to determine, from the execution devices, a target execution device where the computing capability value is greater than or equal to a computing capability value threshold corresponding to the target algorithm, the chip model matches a reference chip model corresponding to the target algorithm, and the system environment information matches reference system environment information corresponding to the target algorithm.

Optionally, the acquiring module 410 is configured to: determine the current computing capability value of the each of the execution devices based on a current CPU idle ratio, a current GPU idle ratio, and a current memory idle ratio of the each of the execution devices.

Optionally, the acquiring module 410 is configured to: for one of the execution devices except a reference execution device, multiply a current CPU idle ratio of the execution device by a first ratio value to acquire a first number; multiply a current GPU idle ratio of the execution device by a second ratio value to acquire a second number; multiply a current memory idle ratio of the execution device by a third ratio value to acquire a third number; and determine a smallest value among the first number, the second number, and the third number as a current computing capability value of the execution device, wherein the first ratio value is a ratio of a CPU basic performance value of the execution device to a CPU basic performance value of the reference execution device, the second ratio value is a ratio of a GPU basic performance value of the execution device to a GPU basic performance value of the reference execution device, and the third ratio value is a ratio of a total memory capacity of the execution device to a total memory capacity of the reference execution device; and for the reference execution device, determine a smallest value among a current CPU idle ratio, a current GPU idle ratio, and a current memory idle ratio of the reference execution device as a current computing capability value of the reference execution device.

Optionally, the sending module 430 is further configured to:

send an instruction message to an algorithm warehouse server, wherein the instruction message is intended to instruct the algorithm warehouse server to send an algorithm code corresponding to the target algorithm to the target execution device.

Optionally, the apparatus further includes:

an execution module, configured to: upon receipt of a task execution failure message returned by the target execution device, acquire the execution environment condition for the target algorithm and current execution environment information of one of the execution devices except the target execution device, determine, from the execution devices except the target execution device, an execution device where execution environment information satisfies the execution environment condition, and send the control message for executing the target task to the determined execution device.

For the apparatus in the above embodiment, practice of performing the operations by each module in the apparatus is already described in the method-related embodiment, which is not described herein any further.

In the apparatus provided in this embodiment of the present disclosure, the target execution device that can successfully execute the target algorithm may be automatically found for the target algorithm based on the execution environment condition for the target algorithm and the current execution environment information of the devices. In this way, an attempt to sequentially execute the target task on the plurality of execution devices is avoided, such that even in the case of a relatively large quantity of tasks and a relatively large quantity of execution devices, a different algorithm can be automatically matched to an execution device that can successfully execute the algorithm, thereby achieving a relatively high task allocation efficiency and a relatively high task execution efficiency.

It should be noted that, when the apparatus for executing a task by a scheduling device provided in the foregoing embodiment schedules the device to execute the task, division of the foregoing function modules is merely used as an example for description. In practical applications, based on a requirement, the functions may be allocated to and completed by different function modules. That is, an internal structure of a server is divided into different function modules, to complete all or some of the functions described above. In addition, the apparatus for executing a task by a scheduling device and the method for executing a task by a scheduling device that are provided in the foregoing embodiments belong to a same concept. For the detailed implementation process, reference may be made to the method embodiment, which is not described herein any further.

Figure 5:
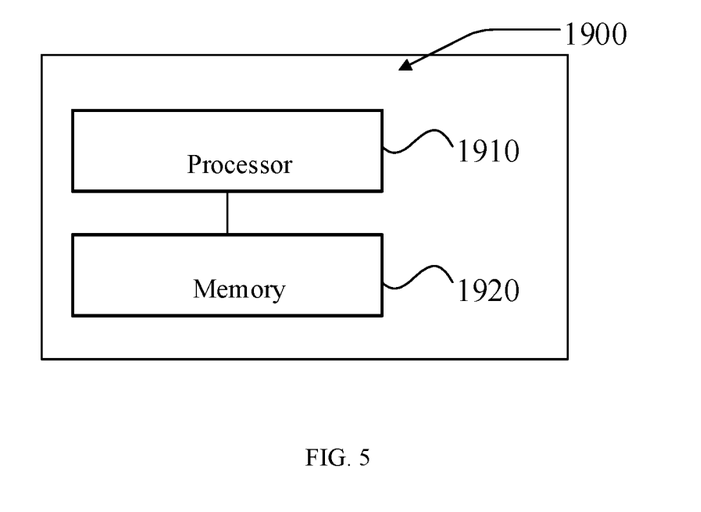
FIG. 5 is a schematic structural diagram of a computer device according to an example embodiment.

FIG. 5 is a schematic structural diagram of a computer device 1900 according to an example embodiment of the present disclosure. The computer device 1900 may have relatively great differences due to different configurations or performance, and may include one or more CPUs 1910 and one or more memories 1920. The memory 1920 stores at least one program, and the at least one program is loaded and executed by the central processing unit 1910, to perform following steps:

acquiring a target algorithm corresponding to a to-be-executed target task;

acquiring an execution environment condition for the target algorithm and current execution environment information of each of execution devices;

determining, from the execution devices, a target execution device where execution environment information satisfies the execution environment condition; and sending a control message for executing the target task to the target execution device.

Optionally, at least one program is loaded and executed by the processor 1910 to further perform following steps acquiring an algorithm corresponding to a task currently executed by the each of the execution devices; and determining, from the execution devices, a target execution device where execution environment information satisfies the execution environment condition and where an algorithm corresponding to a currently executed task is the target algorithm.

Optionally, at least one program is loaded and executed by the processor 1910 to further perform following steps:

acquiring a current computing capability value, a chip model, and system environment information of each of execution devices, wherein the system environment information includes a system bit width and a kernel version; and determining, from the execution devices, a target execution device where the computing capability value is greater than or equal to a computing capability value threshold corresponding to the target algorithm, the chip model matches a reference chip model corresponding to the target algorithm, and the system environment information matches reference system environment information corresponding to the target algorithm.

Optionally, at least one program is loaded and executed by the processor 1910 to further perform following steps:

determining a current computing capability value of the each of the execution devices based on a current central processing unit (CPU) idle ratio, a current graphics processing unit (GPU) idle ratio, and a current memory idle ratio of the each of the execution devices.

Optionally, at least one program is loaded and executed by the processor 1910 to further perform following steps:

for one of the execution devices except a reference execution device, multiplying a current CPU idle ratio of the execution device by a first ratio value to acquire a first number; multiplying a current GPU idle ratio of the execution device by a second ratio value to acquire a second number; multiplying a current memory idle ratio of the execution device by a third ratio value to acquire a third number; and determining a smallest value among the first number, the second number, and the third number as a current computing capability value of the execution device, wherein the first ratio value is a ratio of a CPU basic performance value of the execution device to a CPU basic performance value of the reference execution device, the second ratio value is a ratio of a GPU basic performance value of the execution device to a GPU basic performance value of the reference execution device, and the third ratio value is a ratio of a total memory capacity of the execution device to a total memory capacity of the reference execution device; and for the reference execution device, determining a smallest value among a current CPU idle ratio, a current GPU idle ratio, and a current memory idle ratio of the reference execution device as a current computing capability value of the reference execution device.

Optionally, at least one program is loaded and executed by the processor 1910 to further perform following steps:

sending an instruction message to an algorithm warehouse server, wherein the instruction message is intended to instruct the algorithm warehouse server to send an algorithm code corresponding to the target algorithm to the target execution device.

Optionally, at least one program is loaded and executed by the processor 1910 to further perform following steps:

upon receipt of a task execution failure message returned by the target execution device, acquiring the execution environment condition for the target algorithm and current execution environment information of one of the execution devices except the target execution device, determining, from the execution devices except the target execution device, an execution device where execution environment information satisfies the execution environment condition, and sending the control message for executing the target task to the determined execution device.

An example embodiment of the present disclosure provides a computer-readable storage medium storing a computer program. The computer program, when run by a processor, enables the processor to perform following steps:

acquiring a target algorithm corresponding to a to-be-executed target task;

acquiring an execution environment condition for the target algorithm and current execution environment information of each of execution devices;

determining, from the execution devices, a target execution device where execution environment information satisfies the execution environment condition; and sending a control message for executing the target task to the target execution device.

Optionally, the computer program is run by the processor to further perform following steps:

acquiring an algorithm corresponding to a task currently executed by the each of the execution devices; and determining, from the execution devices, a target execution device where execution environment information satisfies the execution environment condition and where an algorithm corresponding to a currently executed task is the target algorithm.

Optionally, the computer program is run by the processor to further perform the following steps:

acquiring a current computing capability value, a chip model, and system environment information of each of execution devices, wherein the system environment information includes a system bit width and a kernel version; and determining, from the execution devices, a target execution device where the computing capability value is greater than or equal to a computing capability value threshold corresponding to the target algorithm, the chip model matches a reference chip model corresponding to the target algorithm, and the system environment information matches reference system environment information corresponding to the target algorithm.

Optionally, the computer program is run by the processor to further perform following steps:

determining a current computing capability value of the each of the execution devices based on a current central processing unit (CPU) idle ratio, a current graphics processing unit (GPU) idle ratio, and a current memory idle ratio of the each of the execution devices.

Optionally, the computer program is run by the processor to further perform the following steps:

for one of the execution devices except a reference execution device, multiplying a current CPU idle ratio of the execution device by a first ratio value to acquire a first number; multiplying a current GPU idle ratio of the execution device by a second ratio value to acquire a second number; multiplying a current memory idle ratio of the execution device by a third ratio value to acquire a third number; and determining a smallest value among the first number, the second number, and the third number as a current computing capability value of the execution device, wherein the first ratio value is a ratio of a CPU basic performance value of the execution device to a CPU basic performance value of the reference execution device, the second ratio value is a ratio of a GPU basic performance value of the execution device to a GPU basic performance value of the reference execution device, and the third ratio value is a ratio of a total memory capacity of the execution device to a total memory capacity of the reference execution device; and for the reference execution device, determining a smallest value among a current CPU idle ratio, a current GPU idle ratio, and a current memory idle ratio of the reference execution device as a current computing capability value of the reference execution device.

Optionally, the computer program is run executed by the processor to further perform following steps:

sending an instruction message to an algorithm warehouse server, wherein the instruction message is intended to instruct the algorithm warehouse server to send an algorithm code corresponding to the target algorithm to the target execution device.

Optionally, the computer program is run by the processor to further perform following steps:

upon receipt of a task execution failure message returned by the target execution device, acquiring the execution environment condition for the target algorithm and current execution environment information of one of the execution devices except the target execution device, determining, from the execution devices except the target execution device, an execution device where execution environment information satisfies the execution environment condition, and sending the control message for executing the target task to the determined execution device.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as examples only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for executing a task by a scheduling device, comprising:
    acquiring a target algorithm corresponding to a to-be-executed target task, wherein the target algorithm is invoked to actually execute the target task;
    acquiring an execution environment condition for the target algorithm and current execution environment information of each of execution devices, wherein current execution environment information comprises a current computing capability value and system environment information of each of the execution devices, and the system environment information comprises a system bit width and a kernel version;
    determining, from the execution devices, a target execution device where execution environment information satisfies the execution environment condition; and
    sending a control message for executing the target task to the target execution device; and
    wherein acquiring the current execution environment information of the each of the execution devices comprises:
    acquiring the current computing capability value, a chip model, and the system environment information of each of the execution devices; and
    wherein determining, from the execution devices, the target execution device where the execution environment information satisfies the execution environment condition comprises:
    determining, from the execution devices, a target execution device where the current computing capability value is greater than or equal to a computing capability value threshold corresponding to the target algorithm, the chip model matches a reference chip model corresponding to the target algorithm, and the system environment information matches reference system environment information corresponding to the target algorithm;
    wherein acquiring the current computing capability value of the each of the execution devices comprises:
    determining a current computing capability value of the each of the execution devices based on a current central processing unit (CPU) idle ratio, a current graphics processing unit (GPU) idle ratio, and a current memory idle ratio of the each of the execution devices; and
    wherein determining the current computing capability value of the each of the execution devices based on the current CPU idle ratio, the current GPU idle ratio, and the current memory idle ratio of the each of the execution devices includes:
    for one of the execution devices except a reference execution device, multiplying a current CPU idle ratio of the execution device by a first ratio value to acquire a first number, multiplying a current GPU idle ratio of the execution device by a second ratio value to acquire a second number, multiplying a current memory idle ratio of the execution device by a third ratio value to acquire a third number, and determining a smallest value among the first number, the second number, and the third number as a current computing capability value of the execution device, wherein the first ratio value is a ratio of a CPU basic performance value of the execution device to a CPU basic performance value of the reference execution device, the second ratio value is a ratio of a GPU basic performance value of the execution device to a GPU basic performance value of the reference execution device, and the third ratio value is a ratio of a total memory capacity of the execution device to a total memory capacity of the reference execution device; and
    for the reference execution device, determining a smallest value among a current CPU idle ratio, a current GPU idle ratio, and a current memory idle ratio of the reference execution device as a current computing capability value of the reference execution device.

2. The method according to claim 1, further comprising:
    acquiring an algorithm corresponding to a task currently executed by each of the execution devices; and
    wherein said determining, from the execution devices, the target execution device where the execution environment information satisfies the execution environment condition comprises:
    determining, from the execution devices, a target execution device where execution environment information satisfies the execution environment condition and where an algorithm corresponding to a currently executed task is the target algorithm.

3. The method according to claim 1, further comprising:
    sending an instruction message to an algorithm warehouse server, wherein the instruction message is intended to instruct the algorithm warehouse server to send an algorithm code corresponding to the target algorithm to the target execution device.

4. The method according to claim 1, wherein after the control message for said executing the target task is sent to the target execution device, and the method further comprising:
    upon receipt of a task execution failure message returned by the target execution device, acquiring the execution environment condition for the target algorithm and current execution environment information of one of the execution devices except the target execution device, determining, from the execution devices except the target execution device, an execution device where execution environment information satisfies the execution environment condition, and sending the control message for executing the target task to the determined execution device.

5. A computer device, comprising a processor, a communications interface, a memory, and a communications bus; wherein:
the processor, the communications interface, and the memory are configured to communicate with each other by the communications bus;
the memory is configured to store a computer program; and
the processor is configured to run the computer program stored in the memory, to perform following steps:
acquiring a target algorithm corresponding to a to-be-executed target task, wherein the algorithm is invoked to actually execute the target task;
acquiring an execution environment condition for the target algorithm and current execution environment information of each of execution devices, wherein current execution environment information comprises a current computing capability value and system environment information of each of the execution devices, and the system environment information comprises a system bit width and a kernel version;
determining, from the execution devices, a target execution device where execution environment information satisfies the execution environment condition; and
sending a control message for executing the target task to the target execution device; and
wherein the processor is further configured to run the computer program stored in the memory, to perform following steps:
acquiring the current computing capability value, a chip model, and the system environment information of each of the execution devices; and
determining, from the execution devices, a target execution device where the current computing capability value is greater than or equal to a computing capability value threshold corresponding to the target algorithm, the chip model matches a reference chip model corresponding to the target algorithm, and the system environment information matches reference system environment information corresponding to the target algorithm; and
wherein the processor is further configured to run the computer program stored in the memory, to perform following steps:
determining a current computing capability value of the each of the execution devices based on a current central processing unit (CPU) idle ratio, a current graphics processing unit (GPU) idle ratio, and a current memory idle ratio of the each of the execution devices; and
wherein the processor is further configured to run the computer program stored in the memory, to perform following steps:
for one of the execution devices except a reference execution device, multiplying a current CPU idle ratio of the execution device by a first ratio value to acquire a first number, multiplying a current GPU idle ratio of the execution device by a second ratio value to acquire a second number, multiplying a current memory idle ratio of the execution device by a third ratio value to acquire a third number, and determining a smallest value among the first number, the second number, and the third number as a current computing capability value of the execution device, wherein the first ratio value is a ratio of a CPU basic performance value of the execution device to a CPU basic performance value of the reference execution device, the second ratio value is a ratio of a GPU basic performance value of the execution device to a GPU basic performance value of the reference execution device, and the third ratio value is a ratio of a total memory capacity of the execution device to a total memory capacity of the reference execution device; and
for the reference execution device, determining a smallest value among a current CPU idle ratio, a current GPU idle ratio, and a current memory idle ratio of the reference execution device as a current computing capability value of the reference execution device.

6. The computer device according to claim 5, wherein the processor is further configured to run the computer program stored in the memory, to perform following steps:
acquiring an algorithm corresponding to a task currently executed by each of the execution devices; and
determining, from the execution devices, a target execution device where the execution environment information satisfies the execution environment condition and where an algorithm corresponding to a currently executed task is the target algorithm.

7. The computer device according to claim 5, wherein the processor is further configured to run the computer program stored in the memory, to perform following steps:
sending an instruction message to an algorithm warehouse server, wherein the instruction message is intended to instruct the algorithm warehouse server to send an algorithm code corresponding to the target algorithm to the target execution device.

8. The computer device according to claim 5, wherein the processor is further configured to run the computer program stored in the memory, to perform following steps:
upon receipt of a task execution failure message returned by the target execution device, acquiring the execution environment condition for the target algorithm and current execution environment information of one of the execution devices except the target execution device, determining, from the execution devices except the target execution device, an execution device where execution environment information satisfies the execution environment condition, and sending the control message for executing the target task to the determined execution device.

9. A non-transitory computer-readable storage medium storing a computer program therein, wherein the computer program, when run by a processor, enables the processor to perform following steps:
acquiring a target algorithm corresponding to a to-be-executed target task, wherein the target algorithm is invoked to actually execute the target task;
acquiring an execution environment condition for the target algorithm and current execution environment information of each of execution devices, wherein current execution environment information comprises a current computing capability value and system environment information of each of the execution devices, and the system environment information comprises a system bit width and a kernel version;

determining, from the execution devices, a target execution device where execution environment information satisfies the execution environment condition; and sending a control message for executing the target task to the target execution device; and wherein the computer program, when run by the processor, enables the processor to further perform following steps:

acquiring the current computing capability value, a chip model, and the system environment information of each of the execution devices; and determining, from the execution devices, a target execution device where the current computing capability value is greater than or equal to a computing capability value threshold corresponding to the target algorithm, the chip model matches a reference chip model corresponding to the target algorithm, and the system environment information matches reference system environment information corresponding to the target algorithm; and wherein the computer program, when run by the processor, enables the processor to further perform following steps:

determining a current computing capability value of the each of the execution devices based on a current central processing unit (CPU) idle ratio, a current graphics processing unit (GPU) idle ratio, and a current memory idle ratio of the each of the execution devices;

wherein the computer program, when run by the processor, enables the processor to further perform following steps:

for one of the execution devices except a reference execution device, multiplying a current CPU idle ratio of the execution device by a first ratio value to acquire a first number, multiplying a current GPU idle ratio of the execution device by a second ratio value to acquire a second number, multiplying a current memory idle ratio of the execution device by a third ratio value to acquire a third number, and determining a smallest value among the first number, the second number, and the third number as a current computing capability value of the execution device, wherein the first ratio value is a ratio of a CPU basic performance value of the execution device to a CPU basic performance value of the reference execution device, the second ratio value is a ratio of a GPU basic performance value of the execution device to a GPU basic performance value of the reference execution device, and the third ratio value is a ratio of a total memory capacity of the execution device to a total memory capacity of the reference execution device; and for the reference execution device, determining a smallest value among a current CPU idle ratio, a current GPU idle ratio, and a current memory idle ratio of the reference execution device as a current computing capability value of the reference execution device.

10. The non-transitory computer-readable storage medium according to claim 9, wherein the computer program, when run by the processor, enables the processor to further perform following steps:

acquiring an algorithm corresponding to a task currently executed by each of the execution devices; and determining, from the execution devices, a target execution device where the execution environment information satisfies the execution environment condition and where an algorithm corresponding to a currently executed task is the target algorithm.

11. The non-transitory computer-readable storage medium according to claim 9, wherein the computer program, when run by the processor, enables the processor to further perform following steps:

sending an instruction message to an algorithm warehouse server, wherein the instruction message is intended to instruct the algorithm warehouse server to send an algorithm code corresponding to the target algorithm to the target execution device.

\* \* \* \* \*